United States Patent [19]
Campbell et al.

[11] Patent Number: 5,644,666
[45] Date of Patent: Jul. 1, 1997

[54] BROADBAND OPTICAL FIBER COUPLER AND METHOD OF MAKING

[75] Inventors: Daniel R. Campbell, Franklin, Mass.; Pamela A. Weber, Baltimore, Md.

[73] Assignee: Gould Electronics Inc., Eastlake, Ohio

[21] Appl. No.: 577,344

[22] Filed: Dec. 22, 1995

[51] Int. Cl.⁶ ................................................. G02B 6/26
[52] U.S. Cl. ............................... 385/43; 385/42; 385/48
[58] Field of Search .............................. 385/41–48, 43

[56] References Cited

U.S. PATENT DOCUMENTS

| | | | |
|---|---|---|---|
| 4,400,055 | 8/1983 | Ozeki et al. | 385/48 X |
| 4,497,643 | 2/1985 | Kowata et al. | 65/4.21 |
| 4,798,438 | 1/1989 | Moore et al. | 350/96.15 |
| 4,822,128 | 4/1989 | Imoto et al. | 350/96.16 |
| 5,077,817 | 12/1991 | Shang | 385/46 |
| 5,195,151 | 3/1993 | Campbell, Jr. et al. | 385/43 |
| 5,283,847 | 2/1994 | Sasaoka et al. | 385/43 |
| 5,295,210 | 3/1994 | Nolan et al. | 385/43 |
| 5,325,450 | 6/1994 | Suganuma et al. | 385/39 |
| 5,329,600 | 7/1994 | Sasaoka et al. | 385/43 |
| 5,355,426 | 10/1994 | Daniel et al. | 385/39 |
| 5,373,572 | 12/1994 | Arkwright et al. | 385/43 |
| 5,408,554 | 4/1995 | Cryan et al. | 385/43 |
| 5,408,556 | 4/1995 | Wong | 385/48 |

*Primary Examiner*—Phan T. H. Palmer
*Attorney, Agent, or Firm*—D. Peter Hochberg; Mark Kusner; Michael A. Centanni

[57] ABSTRACT

A fused optical fiber coupler comprising a first pair of axially elongated cylindrical fibers, each having a circular transverse cross-section of a first diameter, the first pair of fibers being in fused contact with each other along a continuous line and forming grooves on opposite sides of the line. A second pair of axially elongated cylindrical fibers each having a circular transverse cross-section of a second diameter different than the first diameter of the first pair of fibers, one fiber from the second pair of fibers being disposed in each of the grooves and fused to each of the first pair of fibers.

22 Claims, 8 Drawing Sheets

BROADBAND OPTICAL FIBER COUPLER AND METHOD OF MAKING

FIELD OF THE INVENTION

The present invention relates generally to couplers for optical fibers, and more particularly to fiber optic splitters operable over a broadband of wavelengths.

BACKGROUND OF THE INVENTION

Fiber optics are widely used in many diverse applications, including telecommunication systems, instrumentation and sensing operations. An example of such an application is a multi-access optical telecommunications network. In such a network, optical fiber connects a number of users or subscribers to a central office using passive couplers. This type of network is particularly attractive since there are typically no active optical devices located outside of the central office or subscriber locations.

An optical fiber typically includes an inner core region surrounded by an outer cladding made of a similar material. The inner core has a relatively higher index of refraction than the cladding, resulting in total internal reflection of the light beam within the core. This results in very efficient transmission of light through the core. Light may be transferred or split between separate fibers through the use of a fiber optic coupler. One extensively used type of fiber optic coupler is a fused biconically tapered (FBT) coupler. In one method of producing such a fiber optic coupler, a number of optical fibers are held in axial alignment and elongated while being heated. This process creates a biconically tapered region or waist wherein the optical fibers are fused together and the optical signals from one or more optical fibers can be coupled to or split between the other optical fibers.

The basic optical performance of fiber optic couplers can be described by three fundamental quantities: excess loss, insertion loss and uniformity. The excess loss, expressed in decibels (dB), is a measure of how much light or optical energy is lost in the coupling process. Excess loss is defined as the ratio of the total output power to the amount of optical power launched into the input fiber of the coupler. The ratio of the optical power in one of the output fibers relative to the input optical power is known as the insertion loss. The insertion loss is also often expressed in decibels. Another term often used to characterize the optical performance of couplers is uniformity. Uniformity is a measure of the spread in the insertion losses of the coupler. It is also expressed in decibels and is defined as the difference between the maximum and minimum values of insertion loss.

Many of the fiber optic couplers in use today are designed to operate effectively over only a narrow range or "window" of wavelengths. The most common wavelengths of interest for telecommunication applications are those centered around 1310 nm and 1550 nm. These fiber optic couplers, often called single window couplers, essentially provide equal splitting of light from one or more input fibers to a number of output fibers at a preselected wavelength. The insertion loss of each output port for such a single window coupler changes as a function of the wavelength of the transmitted light. In particular, as the wavelength of the transmitted light varies from the center of the wavelength window, the optical power in the output fibers (i.e., insertion loss) tends to diverge from the ideal value and the uniformity becomes quite large. This behavior typically limits the use of such single window couplers to within ±20 nm of the center of the wavelength window.

In many optical fiber telecommunication applications, simultaneous operation within both 1310 nm and 1550 nm wavelength windows is required in order to provide both telephony and broadband services. In these applications, broadband fiber optic couplers, which exhibit a relatively constant insertion loss over a broad range of wavelengths, are required.

Traditionally, 2×4 couplers have been fabricated by concatenating three 1×2 or 2×2 couplers to form the desired configuration. The resulting tree structure has a fairly large package size, which can be a problem when the space allotted for the coupler is limited.

Recent advances have allowed 2×4 couplers to be built without the need for concatenation. For example, see U.S. Pat. No. 5,355,426 to Daniel et al., which discloses a process, wherein four fibers of mismatched diameters are fused at a single point to achieve a broadband response. This technique basically requires three different fiber diameters to be created prior to fusion. A difficulty with this technique is that precise fiber diameter ratios must be maintained for optimum performance. Variations in the diameter ratios will cause an increase in uniformity, and the diameter ratios can be difficult to control when three different fiber diameters are required.

The present invention overcomes these and other problems and provides a 2×4 broadband coupler and a method for producing same, which apparatus and method utilize two fiber diameters, and provides a coupler which is easier to manufacture and which has improved operating characteristics.

SUMMARY OF THE INVENTION

In accordance with the present invention, there is provided a fused optical fiber coupler comprised of a first pair of axially elongated cylindrical fibers, the fibers of the first pair each having a circular transverse cross-section of a first diameter. The first pair of fibers are in fused contact with each other and form grooves on opposite sides of their line of contact. A second pair of axially elongated cylindrical fibers having a circular transverse cross-section different than the first pair of fibers are disposed in the grooves and fused to each of the first pair of fibers.

In accordance with another aspect of the present invention, there is provided a method of forming a broadband fiber optic coupler, comprising the steps of:

a) arranging a first optical fiber and a second optical fiber side-by-side;

b) wrapping and tensioning the first and second optical fibers to bring them into intimate contact;

c) simultaneously heating and tensioning the fibers until the first and second optical fibers fuse together, the two fibers forming grooves along opposite sides of their line of contact;

d) positioning a third optical fiber in intimate contact with the first and second optical fibers within one of the grooves formed by the fused optical fibers, and positioning a fourth optical fiber in intimate contact with the first and second optical fibers within the other groove formed by the fused optical fibers; and e) heating, elongating and fusing the four optical fibers together to achieve broadband coupling.

In accordance with another aspect of the present invention, there is provided a fused fiber optic coupler formed by the process of:

a) arranging a first optical fiber and a second optical fiber side-by-side;

b) wrapping and tensioning the first and second optical fibers to bring them into intimate contact;

c) simultaneously heating and tensioning the fibers until the first and second optical fibers fuse together, the two fibers forming grooves along opposite sides of their line of contact;

d) positioning a third optical fiber in intimate contact with the first and second optical fibers within one of the grooves formed by the fused optical fibers, and positioning a fourth optical fiber in intimate contact with the first and second optical fibers within the other groove formed by the optical fibers; and e) heating, elongating and fusing the optical fibers together to achieve broadband coupling.

In accordance with another aspect of the present invention, there is provided a broadband fiber optic coupler for single mode fibers comprising a thermally fused lateral intersection of four optical fibers forming a drawn fused tapered coupling region. A first two fibers of the four fibers are in fused coupled contact with each other in the coupling region. The remaining two fibers are disposed on opposite sides of, and in fused coupled contact with, the first two fibers wherein the remaining two fibers are in the coupling region.

It is an object of the present invention to provide a fiber optic coupler having improved broadband behavior.

Another object of the present invention is to provide a fiber optic coupler as described above which is easier and less costly to fabricate than couplers known heretofore.

Another object of the present invention is to provide a fiber optic coupler as described above which utilizes only two fiber diameters.

A still further object of the present invention is to provide a fiber optic coupler as described above which has a flatter spectral response than optical devices utilizing three fiber diameters.

A still further object of the present invention is to provide a fiber optic coupler as described above which is operable over a wider range of wavelengths.

A still further object of the present invention is to provide a fiber optic coupler as described above which may be used as a 1×4 coupler or a 2×4 coupler.

A still further object of the present invention is to provide a method of producing a coupler as described above.

A still further object of the present invention is to provide a method of producing couplers as described above which require only one fiber reduction.

A still further object of the present invention is to provide a method as described above which is consistent and repeatable.

These and other objects and advantages will become apparent from the following description of a preferred embodiment of the invention taken together with the accompanying drawings.

BRIEF DESCRIPTION OF THE DRAWINGS

The invention may take physical form in certain parts and arrangement of parts, an embodiment of which is described in detail in the specification and illustrated in the accompanying drawings wherein.

DETAILED DESCRIPTION OF PREFERRED EMBODIMENT

Referring now to the drawings wherein the showings are for the purpose of illustrating a preferred embodiment of the invention, and not for the purpose of limiting same, FIGS. 1-6 illustrate a method of fabricating a 2×4 broadband fiber optic coupler in accordance with the present invention.

Figure 1:
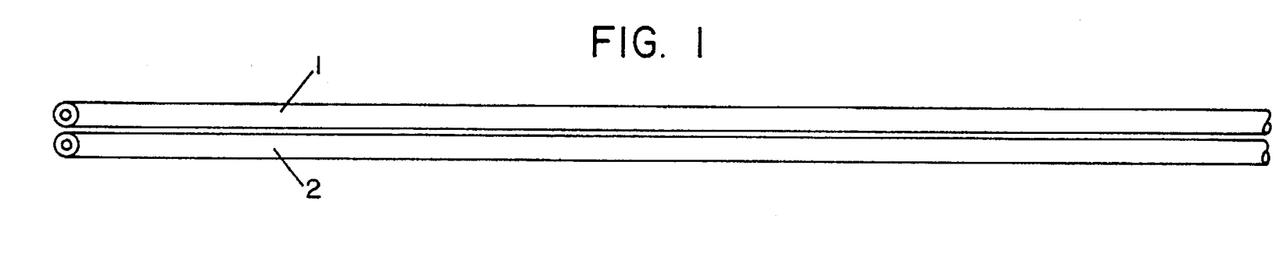
FIGS. 1–7 show steps in forming a broadband fiber optic coupler according to a preferred embodiment of the present invention.
Figure 2:
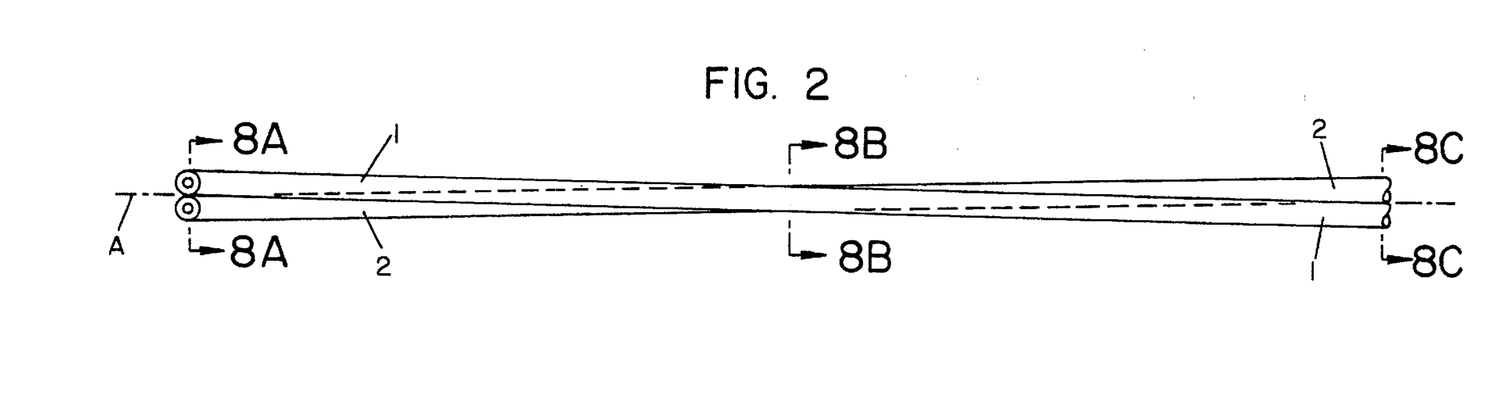
Figure 8A:
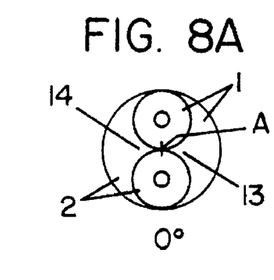
FIGS. 8A–8E are enlarged cross-sectional views taken at several locations along the fiber optic structure shown in FIG. 2.
Figure 8B:
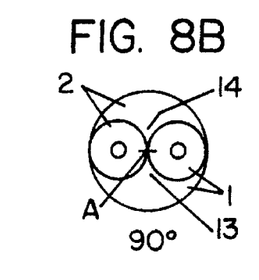
Figure 8C:
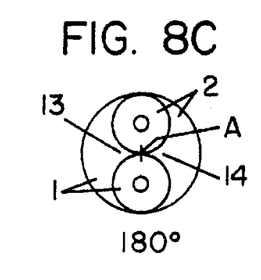
Figure 8D:
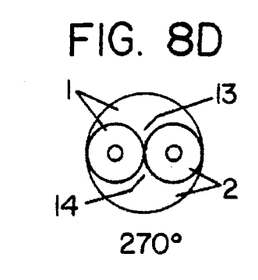
Figure 8E:
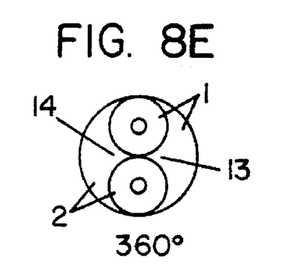
Figure 9A:
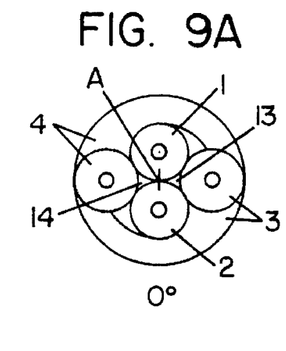
FIGS. 9A–9E are enlarged cross-sectional view taken at several locations along the fiber optic structure shown in FIG. 6.
Figure 9B:
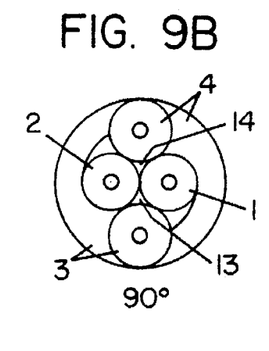
Figure 9C:
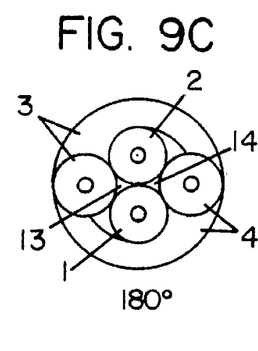
Figure 9D:
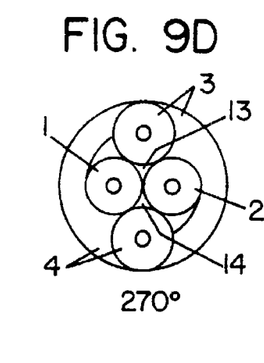
Figure 9E:
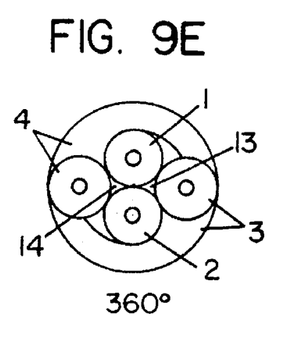

According to with the present invention, four lengths of single mode optical fiber are stripped of all protective buffers and coatings so as to expose a region of bare glass for a length of approximately one inch. The exposed regions of two of the four fibers, designated 1 and 2 in the drawings, are brought together side-by-side, as shown in FIGS. 1 and 2. In the drawings, all optical fibers are shown without protective buffers or coatings, and one end of the fibers is shown sectioned to illustrate generally the core and cladding of each optical fiber. According to the present invention, fibers 1 and 2 are carefully wrapped over each other several times to join one to the other and thereby create a "wrapped fiber zone." As used hereinafter, the phrase "wrapped fiber zone" refers to the lengths of the exposed region of fibers 1, 2 which are wrapped relative to each other. FIG. 2 illustrates a portion of the wrapped fiber zone. In FIG. 2, fiber 1 is wrapped around fiber 2 and the respective fibers have moved 180° from their original positions relative to a line of contact designated "A," as best illustrated in FIGS. 8A–8C. FIG. 8E illustrates the position of fibers 1, 2 where fibers 1, 2 have been wrapped completely, i.e., have moved 360° from their initial positions. As used hereinafter, one "wrap" shall be defined as the change in position of fibers 1, 2, as illustrated in FIGS. 8A–8E.

According to the embodiment heretofore described, fibers 1 and 2 in the "wrapped fiber zone" include at least one "wrap" (i.e., one 360° spiral). It is important to note that fibers 1 and 2 are carefully "wrapped" relative to one another (as contrasted with "twisting" the two fibers) so as to avoid introducing any internal torsional stress in fibers 1, 2 which may adversely affect the polarization properties of light propagating therethrough. In other words, twisting of the individual fibers is to be avoided because of the detrimental effect such twisting has on the optical properties of fibers 1, 2. In this respect, the desired "wrapping" of fibers 1 and 2 should not be accomplished by clamping the ends thereof and twisting them about a central axis.

With fibers 1 and 2 carefully wrapped relative to each other, the axial ends of fibers 1, 2 are then pulled taut so as to bring the two fibers 1, 2 into contact with each other. As indicated above, FIGS. 8A–8E show the relative position of fibers 1, 2 at various spaced apart locations along one "wrap." When fibers 1, 2 are pulled taut, a continuous line of contact is formed between fibers 1 and 2. Ideally, fibers 1, 2 would be arranged in such a manner so as to produce a line of contact along a straight linear axis. In reality, because fibers 1 and 2 are wrapped about each other, the line of contact between fibers 1 and 2 is not along an exact, true "straight line" or "axis," but rather is along a line which is curvilinear, having a contour which may best be described as helical with an extremely gentle pitch. Accordingly, as used herein, the term "line" is intended to describe a line which may be straight or curvilinear. Accordingly, when fibers 1, 2 are pulled taut, a line of contact is formed in the wrapped fiber zone. The line of contact, designated "A" in the drawing, is generally straight or curvilinear.

Figure 3:
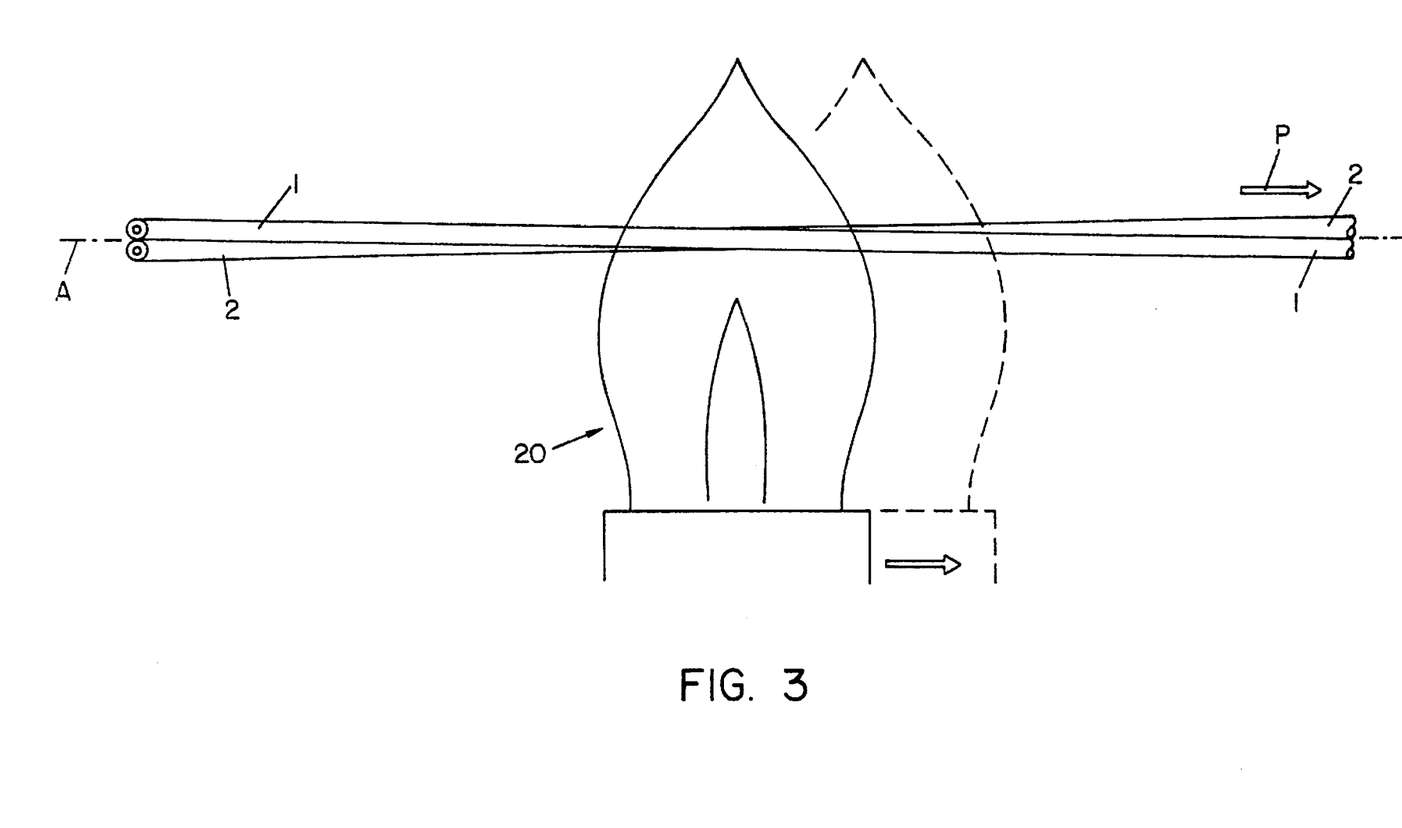

With fibers 1 and 2 in contact with each other, heat is applied to the exposed regions of the glass. According to the present invention, a gas flame, designated 20 in FIG. 3, is used to provide the necessary heat. (As will be appreciated by those skilled in the art, flame 20 depicted in FIG. 3 is not drawn to scale.) Fibers 1, 2 may also be heated by laser energy, induction heating or any other heating means, without deviating from the present invention. Flame 20 is applied to the exposed region of glass of fibers 1, 2 to soften same. As illustrated in FIG. 3, flame 20 is moved along fibers 1, 2 along a portion of the wrapped fibers 1, 2. While flame 20 moves along fibers 1, 2, they are slowly pulled axially from one direction. Fibers 1, 2 are axially pulled as schematically represented by arrow "P" in FIG. 3 in order to stretch fibers 1, 2 and reduce their diameters. The heated sections of fibers 1, 2 have a constant yet reduced diameter over the length of the wrapped fibers 1, 2 scanned by flame 20. The final diameter of fibers 1, 2 in the heated region is controlled by the length fibers 1, 2 are stretched. It is important to note that a uniform relative motion between fibers 1, 2 and flame 20 is required to obtain constant fiber diameters along the heated sections of fibers 1, 2. The method of reducing the fibers as heretofore described is discussed in U.S. Pat. No. 4, 798, 438, the disclosure of which is incorporated herein by reference. Axial force "P" exerted on fibers 1, 2, also ensures that fibers 1, 2 remain in contact during the heating of the fibers. According to the present invention, the actual reduction in size of fibers 1, 2 is relatively slight. Preferably, the length of fibers 1, 2 are stretched such that the actual reduction in the diameter of fibers 1, 2 is less than 10%, and more preferably about 5%. In this respect, for the purpose of illustration, the resulting diameters of fibers 1, 2 as shown in FIGS. 3–7, are noticeably smaller than the original diameters of fibers 1, 2 shown in FIG. 2 and smaller than the diameters of fibers 3, 4 in FIGS. 4–6. This exaggeration is merely to indicate that a change in the diameter exists, and is not intended to represent the actual relative change. Importantly, in addition to reducing the diameters of fibers 1, 2, the heating and pulling of the two contacting fibers 1, 2, fuses fibers 1, 2 together into a single twin-fiber structure along the heated length as a result of the softening of the glass. Also, it is important that the wrapping of fibers 1, 2 produces continuous linear contact between fibers 1, 2 when fibers 1, 2 are pulled taut. The resulting twin-fiber structure is therefore fused together along a line of contact. Wrapped and fused fibers 1, 2 produce grooves or recesses 13, 14 formed on opposite sides of the fused fibers 1, 2. These diametrically opposed grooves or recesses 13, 14 spiral along a generally helical path around the line of contact of the fused fibers 1, 2.

Figure 4:
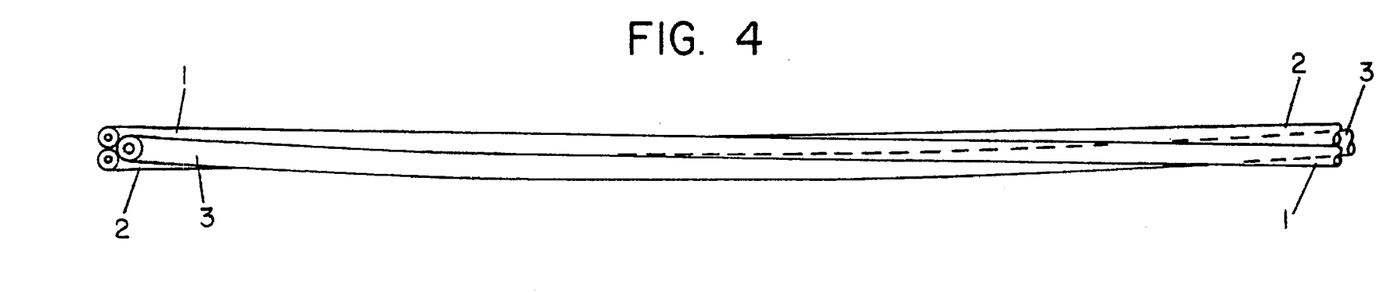

A third fiber 3 is wrapped about fused fibers 1, 2, as schematically shown in FIGS. 4 and 9. Third fiber 3 is positioned to one side of fused fibers 1, 2 within helical groove 13. Third fiber 3 is assembled with fused fibers 1, 2 basically by winding it in the same direction of wrap as fused fibers 1, 2. Third fiber 3 is then pulled taut at its axial ends to cause it to seat or nest itself into groove 13, ensuring contact with both fibers 1, 2. In this respect, because fibers 1, 2 are fused together, there is no relative movement between fibers 1, 2 when third fiber 3 is wrapped around and pulled taut. As a result of the slight wrap of third fiber 3, the axial force pulling third fiber 3 taut produces radial forces directed toward fibers 1, 2. These forces cause third fiber 3 to move into contact with fused fibers 1, 2 thereby ensuring a positive seating or nesting of third fiber 3 in groove 13, and thereby ensuring good contact between third fiber 3 and fused fibers 1, 2.

Figure 5:
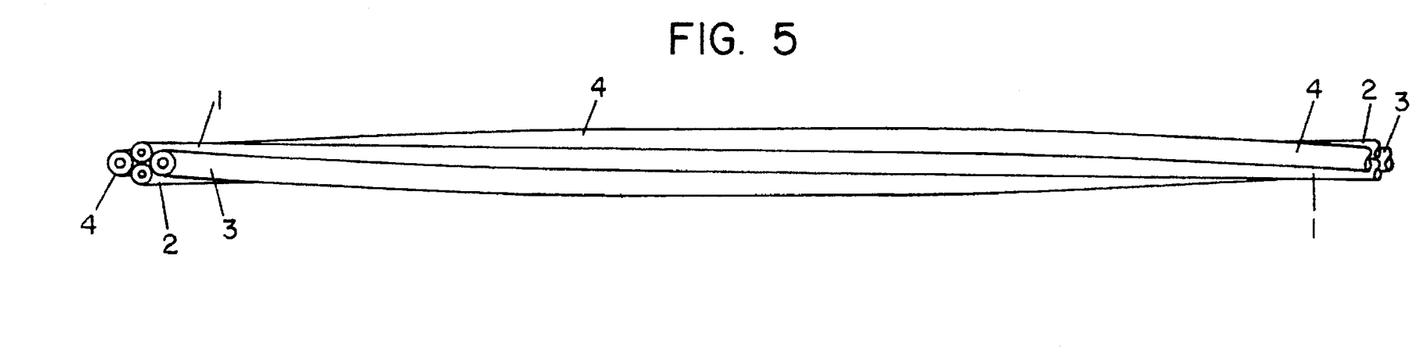

As schematically shown in FIG. 5, a fourth fiber 4 is similarly positioned to the side of the fused fibers 1, 2 within groove 14 and is wrapped around the now three-fiber bundle. Again, it is important to ensure that fourth fiber 4 is wrapped around fused fibers 1, 2 in the same wrap direction as is initially introduced to fused fibers 1, 2. Again, by pulling the end of fourth fiber 4 in an axial direction, radial forces are exerted on fourth fiber 4 causing it to seat itself in groove 14, thereby ensuring contact with both fibers.

Figures 6, 7:
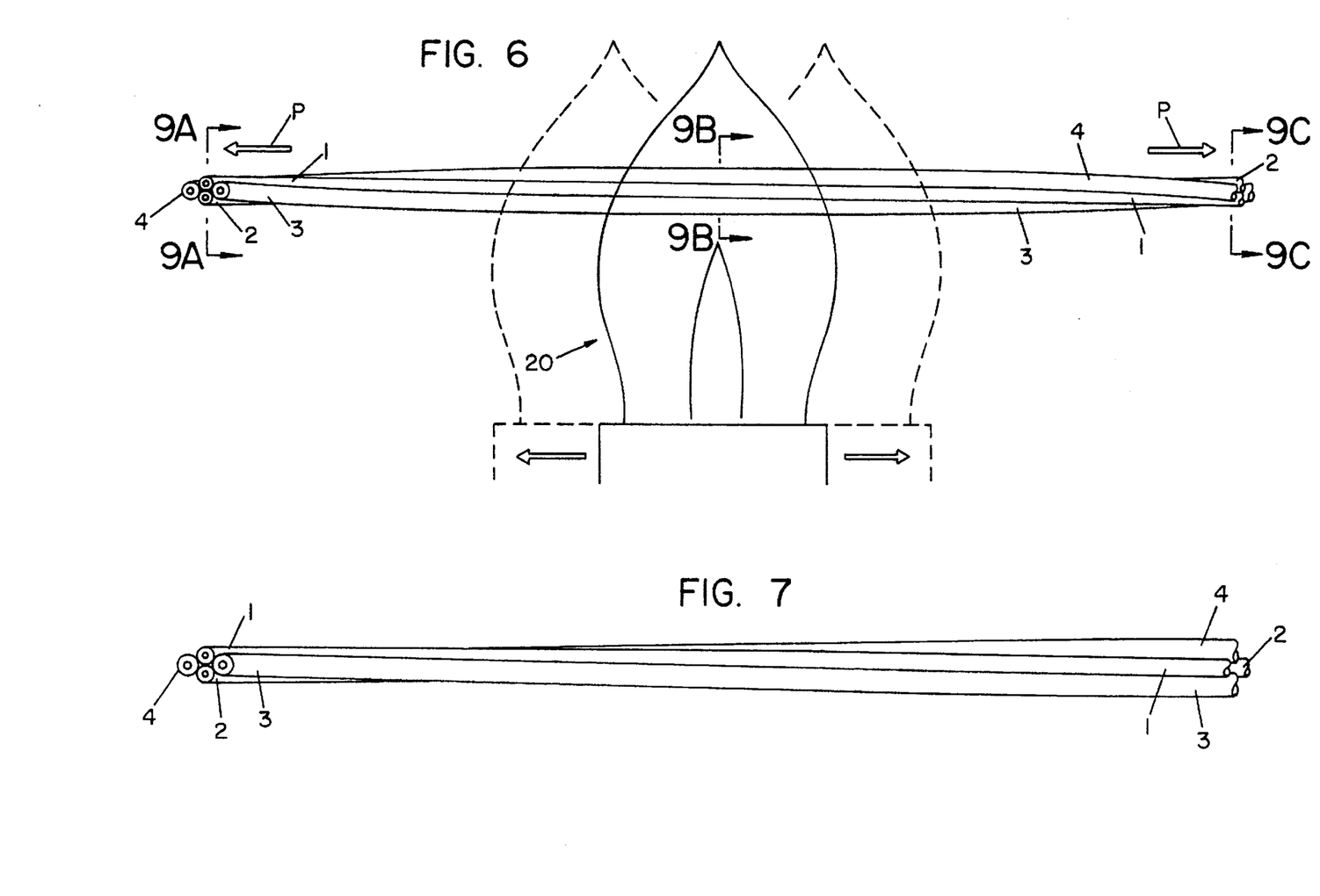

With third and fourth fibers 3, 4 pulled taut, the four-fiber bundle is then heated, as schematically illustrated in FIG. 6, with sufficient heat to soften the glass. Heat source 20 preferably oscillates back and forth parallel to the fiber bundle. Fibers 1–4 are pulled simultaneously from both sides while light is launched into one of the original fused fibers 1, 2. By conventionally known means, the light exiting each of the four output ports (fibers) is monitored using a photodetector (not shown). As fibers 1–4 are heated and pulled, light begins to couple from the input fiber to the other fibers in the bundle. The heating and elongation process is continued until the percentage of light in each of the output ports of the coupler is substantially equal at both 1310 nm and 1550 nm. Once this condition is met, the heating and stretching of fibers 1–4 is then terminated. The heating and elongation process thus produces a drawn fused tapered coupling region, as schematically shown in FIG. 7, which may then be attached to a silica substrate or other support surface (not shown).

Figure 12:
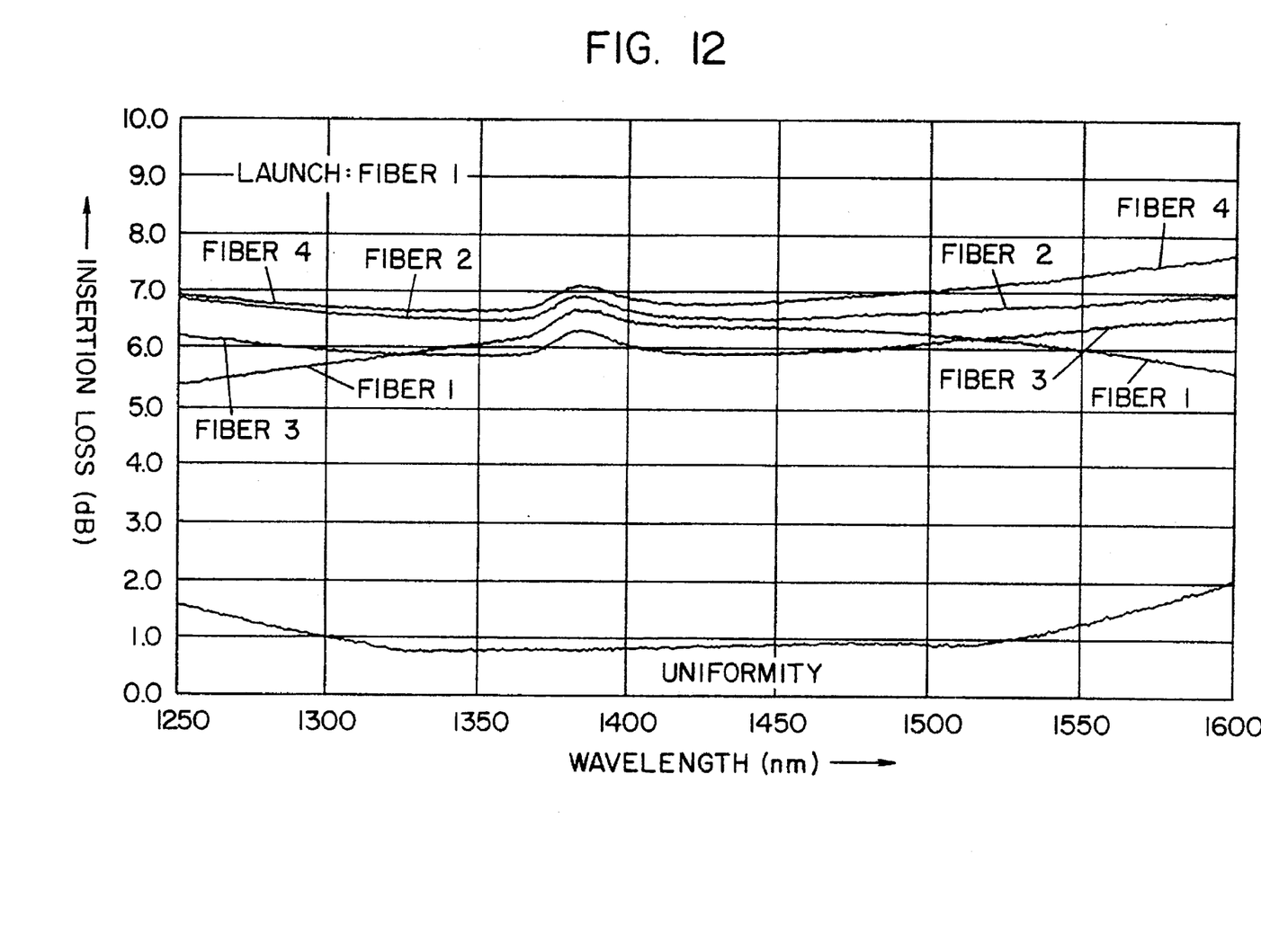
FIG. 12 is a graphical illustration of the spectral response as a function of wavelength for light launched into the first input fiber of a fused broadband 2×4 fiber optic coupler constructed in accordance to the present invention.
Figure 13:
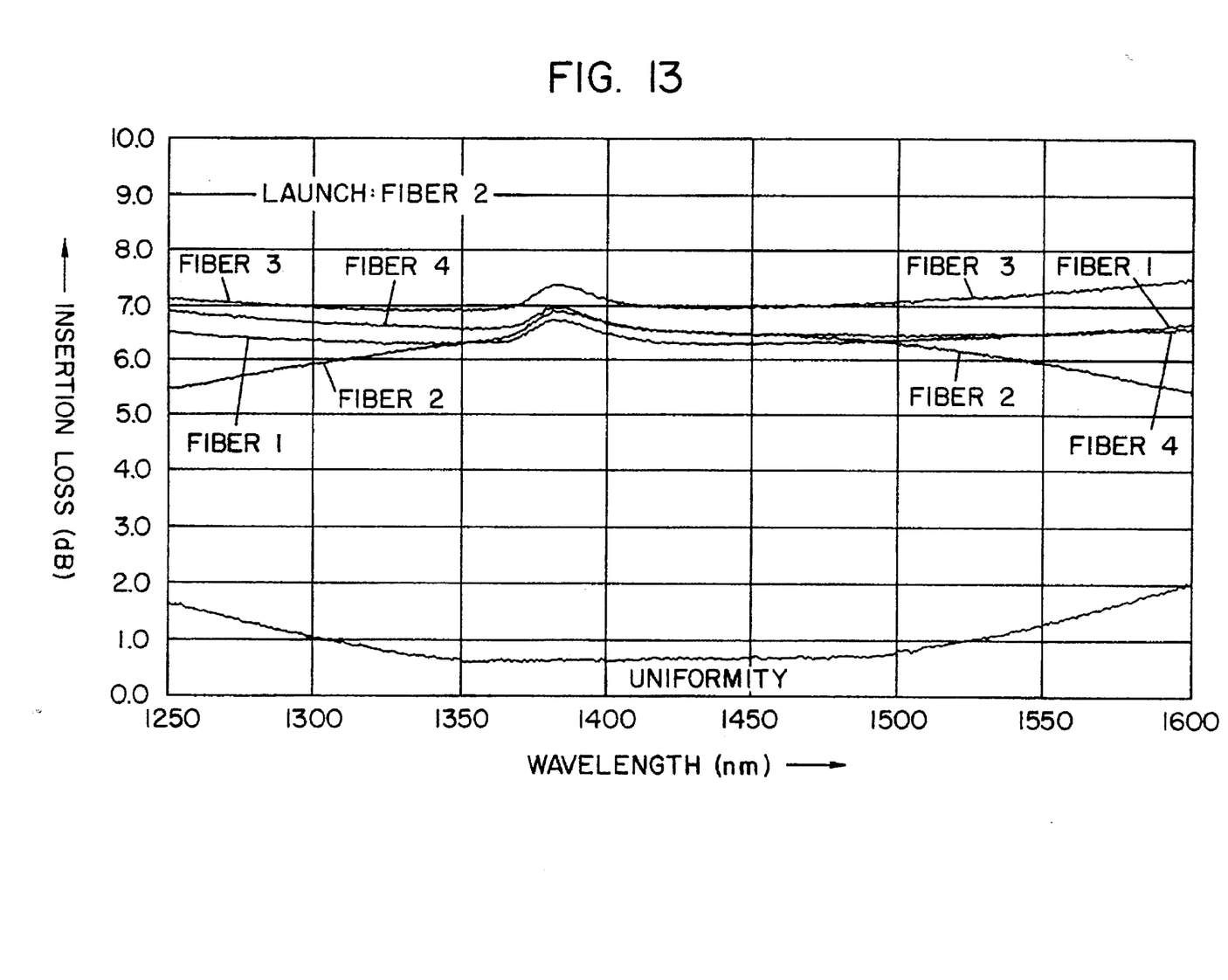
FIG. 13 is a graphical illustration of a spectral response as a function of wavelength for light launched into the second input fiber of a fused broadband 2×4 fiber optic coupler constructed in accordance to the present invention.

The broadband performance of a 2×4 coupler fabricated in accordance with the present invention is illustrated in FIGS. 12 and 13. The test data were obtained by injecting white light into launch fibers 1 and 2 and scanning the outputs of fibers 1, 2, 3 and 4 with an optical spectrum analyzer. As shown in FIGS. 12 and 13, the maximum insertion losses of the coupler were less than 7.5 dB over the extended wavelength range of 1250 nm to 1600 nm. Similarly, for launch fibers 1 and 2, the uniformity of the four outputs was less than 2 dB. Hence, the 2×4 coupler exhibits uniform and broadband coupling over an extended range of wavelengths. The nearly identical behavior of the coupler when light is launched into fibers 1 and 2 clearly demonstrates the ability of the coupler to function as either a 1×4 or 2×4 splitter. The present invention also offers advantages over other methods resulting in an easier, more reliable and reproducible method of fabrication.

Figure 10:
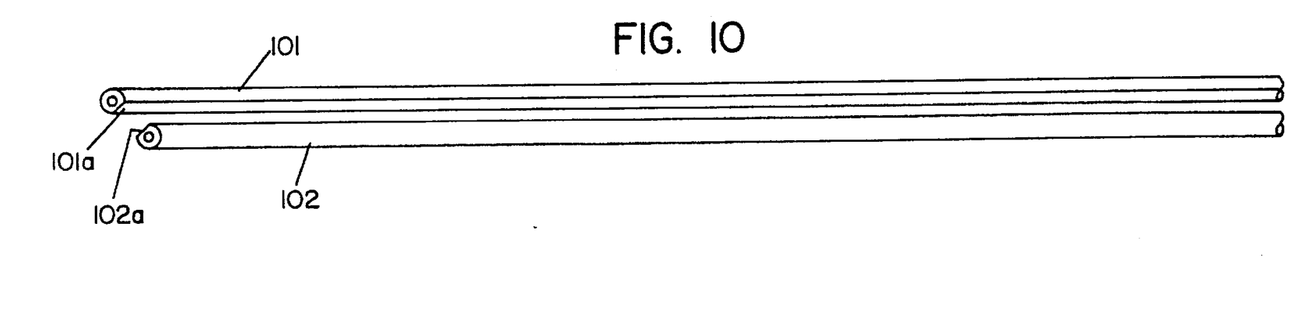
FIGS. 10–11 show steps of forming a broadband fiber optic coupler according to an alternate embodiment of the present invention.
Figure 11:
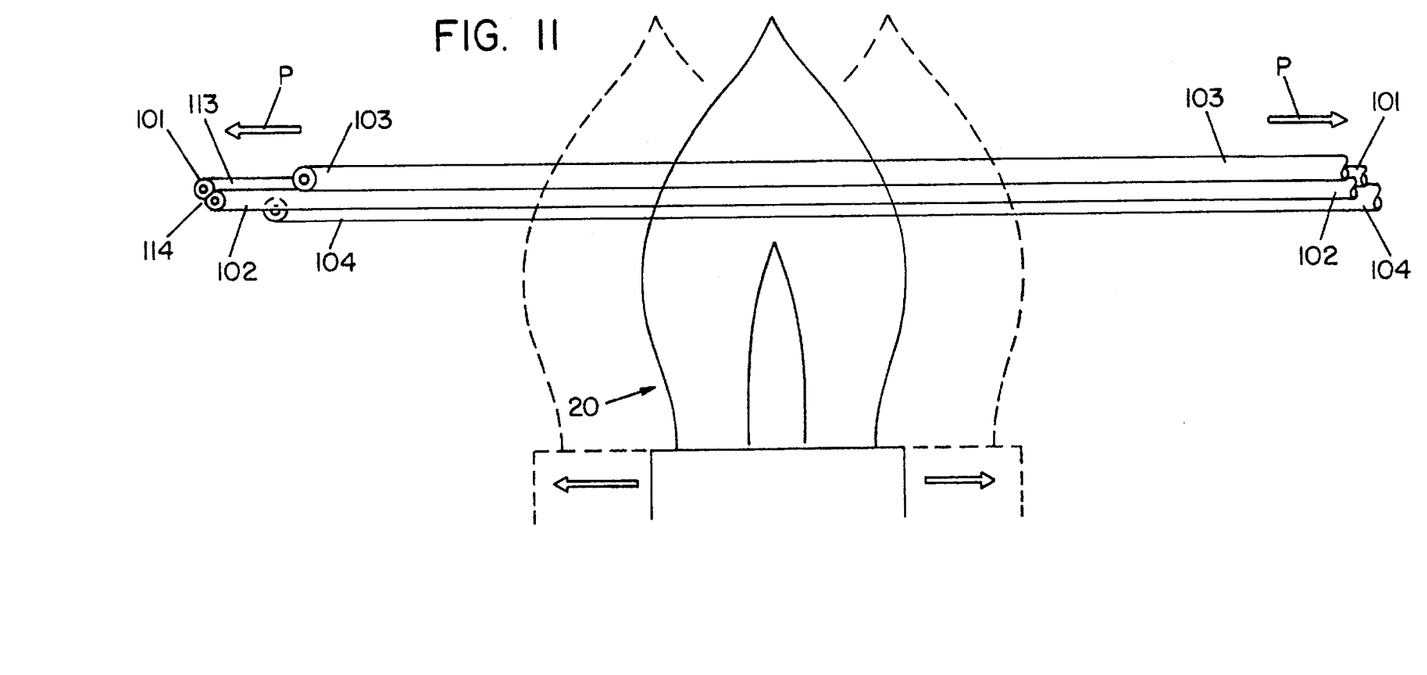

Referring now to FIGS. 10 and 11, an alternate embodiment of the present invention is shown. FIG. 10 shows two lengths of optical fiber, designated 101, 102. Fibers 101, 102 are stripped of all protective buffers and coatings so as to expose regions of bare glass. The exposed regions of glass are polished, or otherwise formed, to define flat surfaces 101a, 102a axially along one side of fibers 101, 102. Fibers 101, 102 are then positioned side-by-side and forced together with surfaces 101a, 102a in contact with each other. As will be appreciated, flat surfaces 101a, 102a, facilitate maintaining fibers 101, 102 together without one fiber shifting or sliding over the other. As in the prior embodiment, the exposed regions of fibers 101, 102 are then heated, in a manner as described above, and pulled to fuse fibers 101, 102 together, and to slightly reduce the cross-section thereof. As with the prior embodiment, fused fibers 101, 102 form grooves or recesses 113, 114 on the opposite sides thereof. A third fiber 103 may be positioned in groove 113 and a fourth fiber 104 may be positioned within groove 114. The four fiber bundle is pulled taut in a manner as described above. Simultaneously, the four fiber bundle is heated and pulled while light is launched into one of the original two fibers 101, 102. The heating and elongating process is continued until the percentage of light in each of the output ports of the coupler is substantially equal at both 1310 nm and 1550 nm.

Whereas the embodiment previously discussed utilized the inward axial force caused by the wrapping of the fibers to maintain contact between the initial two fibers 1, 2, the later described embodiment utilizes flat surfaces 101a, 102a to facilitate mating and contact between initial fibers 101, 102. In both embodiments, the third and fourth fibers are positioned and nest within the grooves or recesses formed by the fused initial two fibers, thereby ensuring proper positioning and contact between the fibers.

The present invention thus provides couplers having a more uniform spectral response over a wide band of wavelengths. It is believed that the accurate positioning and alignment of the fibers in positive contact with each other facilitates the improved operating characteristic of couplers according to the present invention. As seen in FIGS. 8 and 9, each fiber in the coupler is in intimate contact with the launch fiber prior to elongation and coupling. It is believed that this positioning and the relative initial spacing between the cores, which spacing is fairly similar because of the similarly sized fiber and minimum reduction during the fusing step, contribute to the exceptional performance of couplers formed according to the present invention. It is also believed that improved operating characteristics results from the use of only two different fiber diameters, as contrasted with three or more different diameters. By using two pairs of similar sized fibers, the positions and positioning of the fibers relative to each other are more accurately controlled, and facilitate the accurate alignment discussed above.

Importantly, the present invention provides a coupler which may be used as a 2×4 component, but which can also function automatically as a 1×4 component by simply utilizing one of fibers 1, 2 as the launch fiber. In this respect, while the invention has been described with respect to a 2×4 coupler, it will be appreciated that coupled fibers including three (3) or more fibers may also be produced without deviating from the present invention. Other modifications and alterations will occur to those skilled in the art upon a reading and understanding of the present invention. It is intended that all such modifications and alterations be included insofar as they come within the scope of the patent as claimed or the equivalents thereof.

Having described the invention, the following is claimed:

1. A fused fiber optic coupler, comprised of:

a first pair of axially elongated cylindrical fibers, the fibers of said first pair each having a circular transverse cross-section of a first diameter, said first pair of fibers being in fused contact with each other along a line of contact and forming grooves on opposite sides of said line of contact; and a second pair of axially elongated cylindrical fibers, the fibers of said second pair each having a circular transverse cross-section of a second diameter greater than said first diameter, one fiber from said second pair of fibers being disposed in each of said grooves and fused to each of said first pair of fibers.

2. A fused fiber optic coupler as described in claim 1, wherein said first pair of fibers are wrapped around each other and form opposed helical grooves on opposite sides of said line of contact.

3. A method of forming a broadband fiber optic coupler, comprising the steps of:

a) arranging a first optical fiber and a second optical fiber side-by-side;

b) bringing said first and second optical fibers together into intimate contact with each other;

c) simultaneously heating and tensioning said fiber until said first and second optical fibers fuse together, said two fibers forming grooves along opposite sides of said the line of fusion;

d) positioning a third optical fiber in intimate contact with said first and second optical fibers within one of the grooves formed by said first and second optical fibers, and positioning a fourth optical fiber in intimate contact with said first and second optical fibers within the other groove formed by said optical fibers; and e) heating, elongating and fusing said optical fibers together to achieve broadband coupling.

4. A method as defined in claim 3, wherein said first and second optical fibers have the same diameter.

5. A method as defined in claim 3, wherein said third and fourth optical fibers have the same diameter.

6. A method as defined in claim 3, wherein said first and second optical fibers are brought into contact with each other by wrapping said fiber around each other.

7. A method as defined in claim 3, wherein said first and second fibers are brought into contact with each other along a flat surface formed into each fiber.

8. A fused optical fiber coupler, comprised of:

a first pair of axially elongated cylindrical fibers, the fibers of said first pair each having a circular transverse cross-section of a first diameter, said first pair of fibers being in fused contact with each other along a line of contact and forming grooves on opposite sides of said line of contact; and a second pair of axially elongated cylindrical fibers, the fibers of said second pair each having a circular transverse cross-section of a second diameter different than said first diameter of said first pair of fibers, one fiber from said second pair of fibers being disposed in each of said grooves and fused to each of said first pair of fibers.

9. A fused optical fiber coupler as described in claim 8, wherein said first pair of optical fibers are wrapped around each other and form helical grooves on opposite sides of said wrapped fibers.

10. A fused optical fiber coupler as defined in claim 8, wherein said first pair and second pair of optical fibers are parallel to each other.

11. A fused optical fiber coupler formed by the process of:

a) arranging a first optical fiber and a second optical fiber side-by-side;

b) wrapping said first and second optical fibers around each other and tensioning said first and second optical fibers to bring them into intimate contact with each other;

c) simultaneously heating and tensioning said fibers until said first and second optical fibers fuse together, said two fibers forming helical grooves along opposite sides;

d) positioning a third optical fiber in intimate contact with said first and second optical fibers within one of the grooves formed by said optical fibers, and positioning a fourth optical fiber in intimate contact with said first and second optical fibers within the other groove formed by said optical fibers; and e) heating, elongating and fusing said optical fibers together to achieve broadband coupling.

12. A coupler as defined in claim 11, wherein said first and second optical fibers have the same diameter.

13. A coupler as defined in claim 11, wherein said third and fourth optical fibers have the same diameter.

14. A broadband fiber optic coupler for single mode fibers, comprising: a thermally fused lateral intersection of four optical fibers forming a drawn fused tapered coupling region, a first two fibers of said four fibers being in fused coupled contact with each other in said coupling region, the remaining two fibers being disposed on opposite sides of said fused fibers, and in fused coupled contact with said first two fibers wherein said remaining two fibers are equispaced from said first two fibers in said coupling region.

15. A coupler as defined in claim 14, wherein said first two fibers have substantially the same diameter in said coupling region.

16. A coupler as defined in claim 15, wherein said remaining two fibers have substantially the same diameter in said coupling region.

17. A coupler as defined in claim 16, wherein said remaining two fibers are different in diameter than said first two fibers in said coupling region.

18. A coupler as defined in claim 16, wherein said remaining two fibers are less than 10% larger in diameter than said first two fibers in said coupling region.

19. A 2×4 broadband optical fiber coupler comprising four optical fibers fused at a region of coupling, with two of said four fibers being launch fibers and extending through the region of coupling to provide output fibers, said two launch fibers being in fused coupled contact with each other, the remaining two fibers being dissimilar to said launch fibers and being disposed on opposite sides of said launch fibers in fused coupled contact with both of said launch fibers wherein said remaining two fibers are equispaced from said launch fibers in said coupling region and the dissimilarity of said launch fibers from said remaining fibers is of a degree to provide broadband response over a predetermined range of wavelengths.

20. A coupler as defined in claim 19, wherein said launch fibers are identical, and said remaining fibers are identical and larger than said launch fibers.

21. A coupler as defined in claim 19, wherein said launch fibers are identical and said remaining fibers are identical, and the dissimilarity between said launch fibers and said remaining fibers is less than 10% in diameter.

22. A coupler as defined in claim 19, wherein said launch fibers are wrapped around each other and form helical grooves on opposite sides of said launch fibers, and said remaining fibers are disposed in said helical grooves.

* * * * *